(12) United States Patent
Kim

(10) Patent No.: US 11,884,325 B2
(45) Date of Patent: Jan. 30, 2024

(54) PLATFORM STRUCTURE FOR ELECTRIC VEHICLE

(71) Applicant: MOHENIC MOTORS CO., LTD., Jeollanam-do (KR)

(72) Inventor: Tae-Sung Kim, Goyang-si (KR)

(73) Assignee: MOHENIC MOTORS CO., LTD., Jeollanam-do (KR)

( * ) Notice: Subject to any disclaimer, the term of this patent is extended or adjusted under 35 U.S.C. 154(b) by 0 days.

(21) Appl. No.: 17/555,361

(22) Filed: Dec. 17, 2021

(65) Prior Publication Data

US 2023/0026362 A1 Jan. 26, 2023

(30) Foreign Application Priority Data

Jul. 20, 2021 (KR) .................. 10-2021-0094577

(51) Int. Cl.
*B62D 21/07* (2006.01)
*B62D 21/12* (2006.01)

(52) U.S. Cl.
CPC ............. *B62D 21/07* (2013.01); *B62D 21/12* (2013.01)

(58) Field of Classification Search
CPC ........ B62D 21/00; B62D 21/02; B62D 21/03; B62D 21/07; B62D 21/12; B62D 21/18; B62D 21/183; B62D 21/20
USPC ........... 296/204, 205, 29; 403/217, 218, 223
See application file for complete search history.

(56) References Cited

U.S. PATENT DOCUMENTS

| | | | | |
|---|---|---|---|---|
| 4,660,345 A | * | 4/1987 | Browning | B62D 21/08 164/63 |
| 5,131,487 A | * | 7/1992 | DeWees | B60R 19/00 280/727 |
| 5,720,511 A | * | 2/1998 | Benedyk | B62D 29/008 280/798 |
| 6,371,767 B1 | * | 4/2002 | Libby | G09B 19/0069 296/205 |

FOREIGN PATENT DOCUMENTS

KR 101220768 B1 1/2013

* cited by examiner

*Primary Examiner* — Joseph D. Pape
(74) *Attorney, Agent, or Firm* — Rabin & Berdo, P.C.

(57) ABSTRACT

A platform structure for an electric vehicle is proposed. More particularly, according to the platform structure for an electric vehicle, a frame configured by coupling pipes to each other to form a lattice structure is installed to have a vertical double structure, and each pipe constituting an upper frame and each pipe constituting a lower frame intersect with each other such that rigidity of the platform structure is secured and the manufacturing period thereof due to easy manufacturing is decreased to reduce manufacturing cost. The platform structure for an electric vehicle includes a frame of the platform structure configured in such a manner that pipes are coupled to each other by brackets to form a lattice structure.

6 Claims, 6 Drawing Sheets

[110; 110a, 110b]
[120; 120a, 120b]
[130; 130a, 130b, 130c, 130d, 130e, 130f]
[140; 140a, 140b, 140c, 140d]
[150; 150a, 150b]

[110: 110a, 110b]
[120: 120a, 120b]
[130: 130a, 130b, 130c, 130d, 130e, 130f]
[140: 140a, 140b, 140c, 140d]
[150: 150a, 150b]
[160: 160a, 160b]

[110; 110a, 110b]
[120; 120a, 120b]
[130; 130a, 130b, 130c, 130d, 130e, 130f]
[140; 140a, 140b, 140c, 140d]
[150; 150a, 150b]
[160; 160a, 160b]

PLATFORM STRUCTURE FOR ELECTRIC VEHICLE

FIELD OF THE INVENTION

The present disclosure relates generally to a platform structure for an electric vehicle. More particularly, the present disclosure relates to a platform structure for an electric vehicle in which a frame configured by coupling pipes to each other to form a lattice structure is installed to have a vertical double structure, and each pipe constituting an upper frame and each pipe constituting a lower frame intersect with each other such that rigidity of the platform structure is secured and the manufacturing period thereof due to easy manufacturing is decreased to reduce manufacturing cost.

DESCRIPTION OF THE RELATED ART

In recent years, interest in eco-friendly electric vehicles for the future environment has increased, and automobile manufacturers are intensively conducting research and development on such vehicles.

Meanwhile, such an electric vehicle includes a battery inside and, when necessary, receives power from the outside and charges the battery to realize vehicle driving by using the power charged in the battery, and battery-related design and research and development are intensively performed.

However, in terms of battery efficiency, it is difficult for electric vehicles developed so far to travel more than 300 to 400 km on a single (full) charge.

Meanwhile, as a method for overcoming the limitation of the mileage of an electric vehicle due to a single charge, research in which the weight reduction of the body of the electric vehicle, that is, an underbody thereof is realized to increase the mileage of the electric vehicle has been conducted.

For example, in a conventional case, in order to reduce the weight of an underbody for an electric vehicle, the material of the underbody is replaced with plastic or aluminum, or when the material of the underbody is steel, the material is partially replaced with a material with high rigidity to reduce the thickness of the material such that the weight reduction of the underbody is realized.

However, regarding the amount of $CO_2$ emitted during an entire product life cycle from production to recycling, conventional plastics or aluminum materials emit significantly more $CO_2$ than steel materials. In particular, plastics used in vehicle bodies are not easy to be recycled, are difficult to maintain rigidity thereof, and are expensive compared to steel materials.

In addition, when the thickness of the material of the conventional underbody is reduced by partially increasing rigidity in the conventional underbody made of a steel material, there is a problem in that the bending and torsional rigidity of the entirety of the underbody are lowered.

The lowering of the bending rigidity and torsional rigidity of the underbody causes a more fundamental problem of lowering the ride quality and steering performance of an electric vehicle.

Document of Related Art (Patent Document 1) Korean Patent No. 10-1220768

SUMMARY OF THE INVENTION

Accordingly, the present disclosure has been made keeping in mind the above problems occurring in the related art, and the present disclosure is intended to propose a platform structure for an electric vehicle in which a frame configured by coupling pipes to each other to form a lattice structure is installed to have a vertical double structure, and each pipe constituting an upper frame and each pipe constituting a lower frame intersect with each other such that rigidity of the platform structure is secured and the manufacturing period thereof due to easy manufacturing is decreased to reduce manufacturing cost.

In order to achieve the above objectives, according to one aspect of the present disclosure, there is provided a platform structure for an electric vehicle, the structure including: a frame of the platform structure configured in such a manner that pipes are coupled to each other by brackets to form a lattice structure.

In this case, the brackets may include: a front bracket provided at a front of the frame, a rear bracket provided at a rear of the frame, cross brackets provided respectively in multiple rows between the front bracket and the rear bracket, a corner bracket provided at each of left and right outer sides of each of most front and rear rows of the cross brackets, and a side bracket provided at each of left and right outer sides of a middle row of the cross brackets.

In addition, pipes may pass through and be coupled to the cross brackets in front-to-rear or left-to-right directions, and pipes may be coupled to the cross brackets in the left-to-right or front-to-rear directions intersecting with the front-to-rear or left-to-right directions.

Furthermore, the pipes may pass through and be coupled to the cross brackets in the directions intersecting with the front-to-rear or left-to-right directions in which pipes pass through and are coupled to neighboring cross brackets at fronts or rears of the cross brackets.

Meanwhile, the pipes may be coupled to the brackets so as to form vertical pairs such that the frame has a vertical double structure having upper and lower frames.

Additionally, one pipe of the pipes of the upper and lower frames coupled to the cross brackets may pass through and be coupled to each of the cross brackets in a front-to-rear or left-to-right direction, and another pipe of the pipes of the upper and lower frames coupled to the cross brackets may be coupled to each of the cross brackets in the left-to-right or front-to-rear direction thereof intersecting with the front-to-rear or left-to-right direction.

In addition, the platform structure may further include: an installation bracket through which the pipes pass to be coupled thereto.

According to the platform structure for an electric vehicle of the present disclosure, a frame configured by coupling pipes to each other to form a lattice structure is installed to have a vertical double structure, and each pipe constituting an upper frame and each pipe constituting a lower frame intersect with each other such that rigidity of the platform structure is secured and the manufacturing period thereof due to easy manufacturing is decreased to reduce manufacturing cost.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
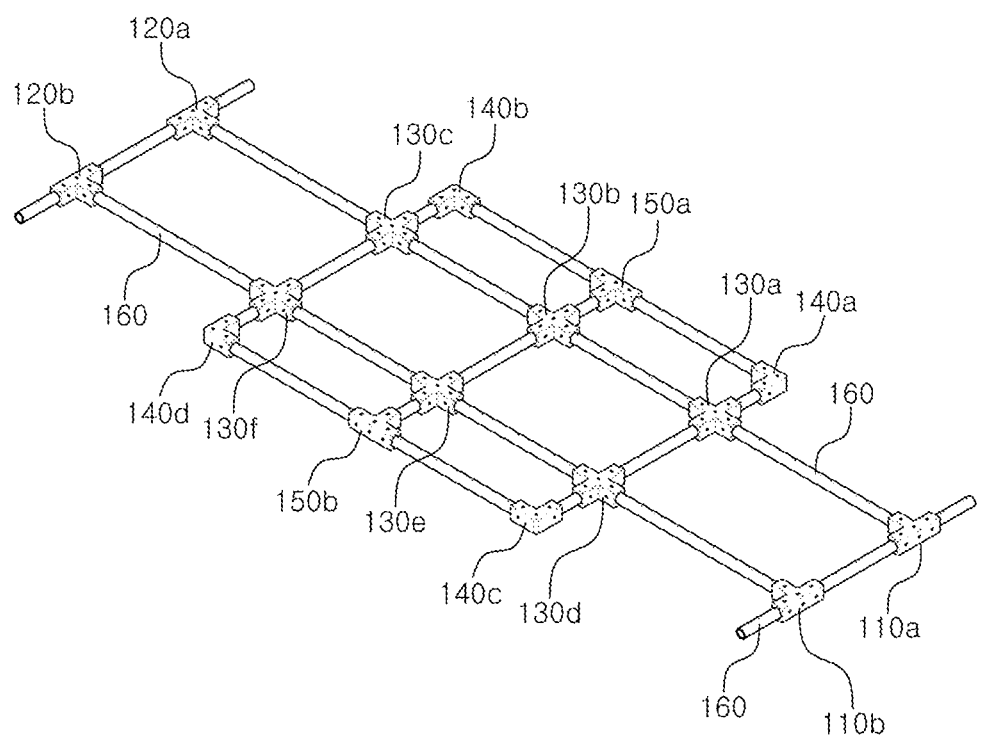
FIG. 1 is a perspective view illustrating a platform structure for an electric vehicle according to a first embodiment of the present disclosure.

Hereinafter, the exemplary embodiments of the present disclosure will be described in more detail with reference to the accompanying drawings. The same reference numerals are used for the same components in the drawings, and duplicate descriptions of the same components are omitted. Additionally, it should be understood that the electric two-wheeled vehicle body of the present disclosure may be embodied in many different forms and is not limited to the described embodiments.

In addition, in the drawings, a right side is front, a left side is rear, an upper side is left, and a lower side is right.

Figure 2:
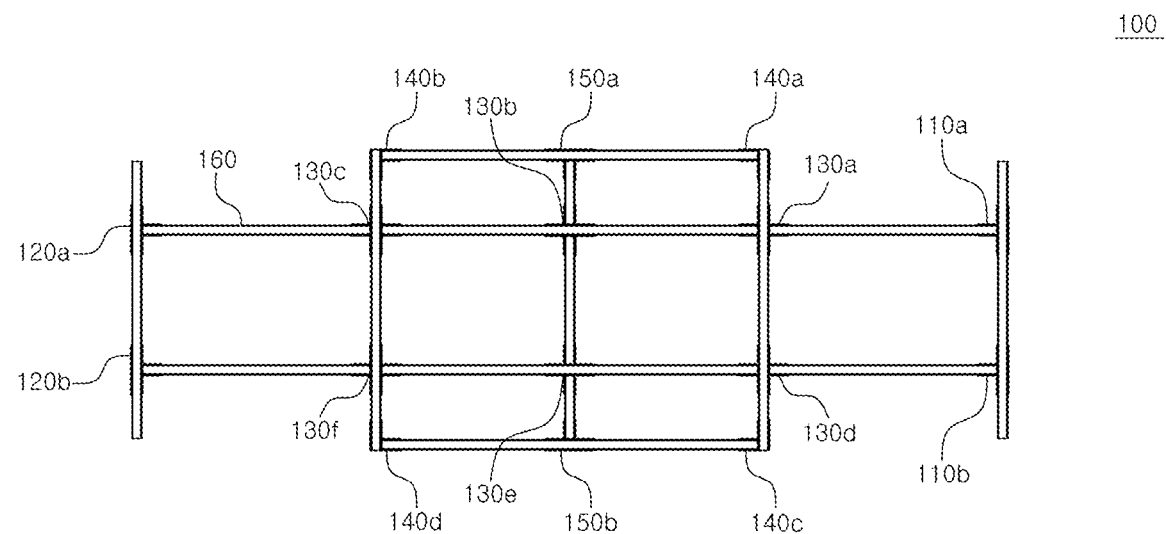
FIG. 2 is a cross-sectional view illustrating the platform structure for an electric vehicle according to the first embodiment of the present disclosure.
Figure 3:
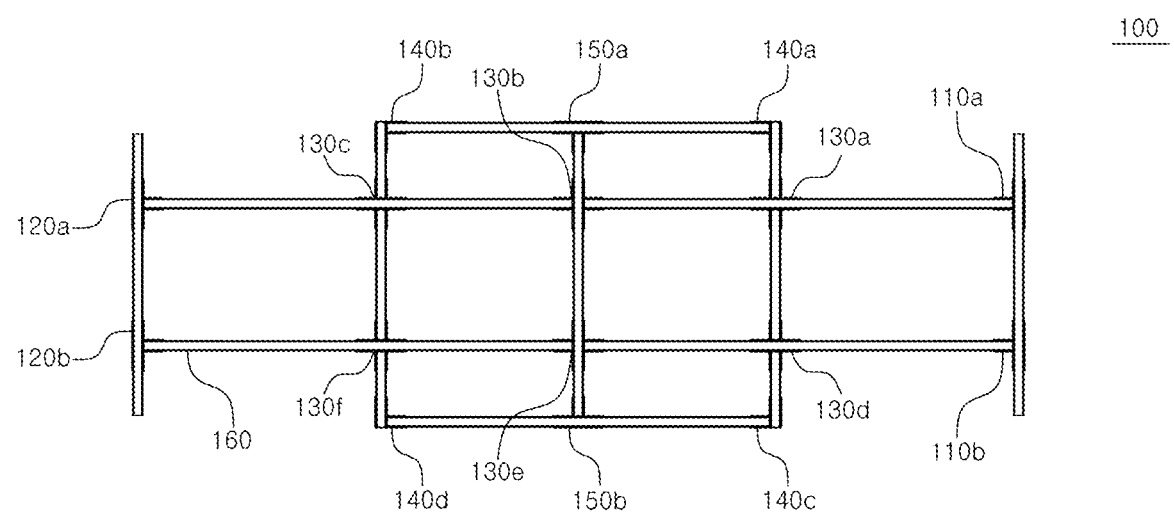
FIG. 3 is a cross-sectional view illustrating the platform structure for an electric vehicle according to a second embodiment of the present disclosure.
Figure 4:
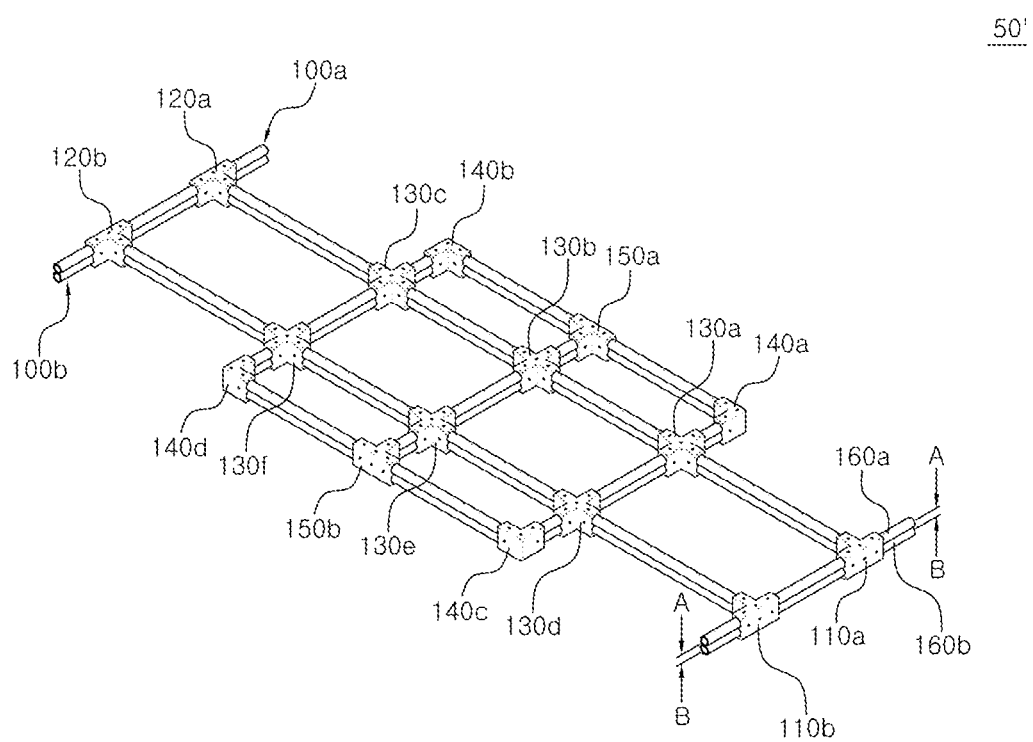
FIG. 4 is a perspective view illustrating the platform structure for an electric vehicle according to a third embodiment of the present disclosure.
Figure 5:
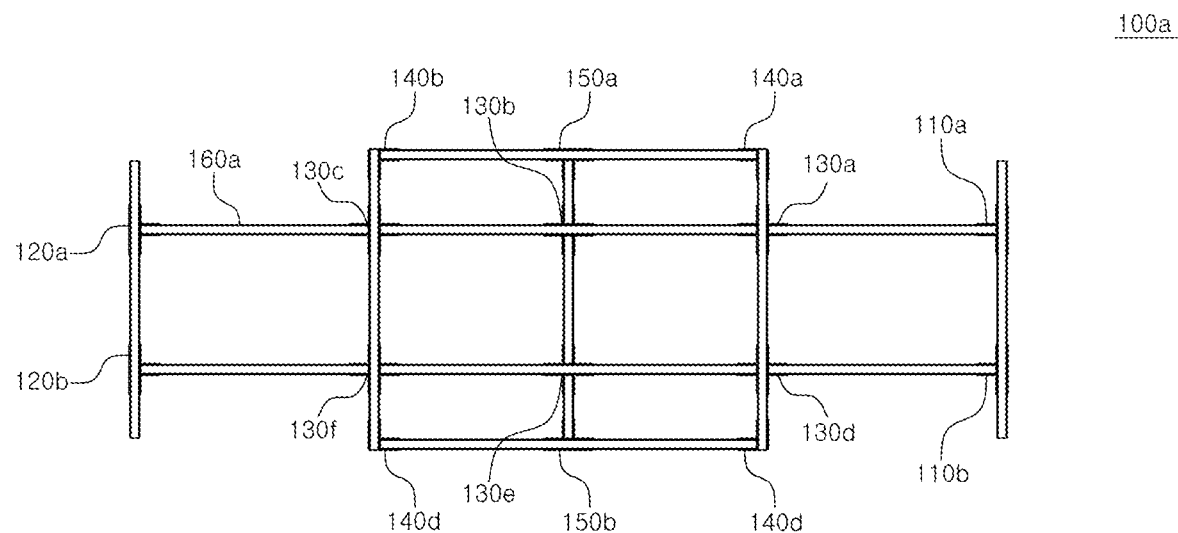
FIG. 5 is a cross-sectional view illustrating the upper frame of the platform structure for an electric vehicle according to the present disclosure.
Figure 6:
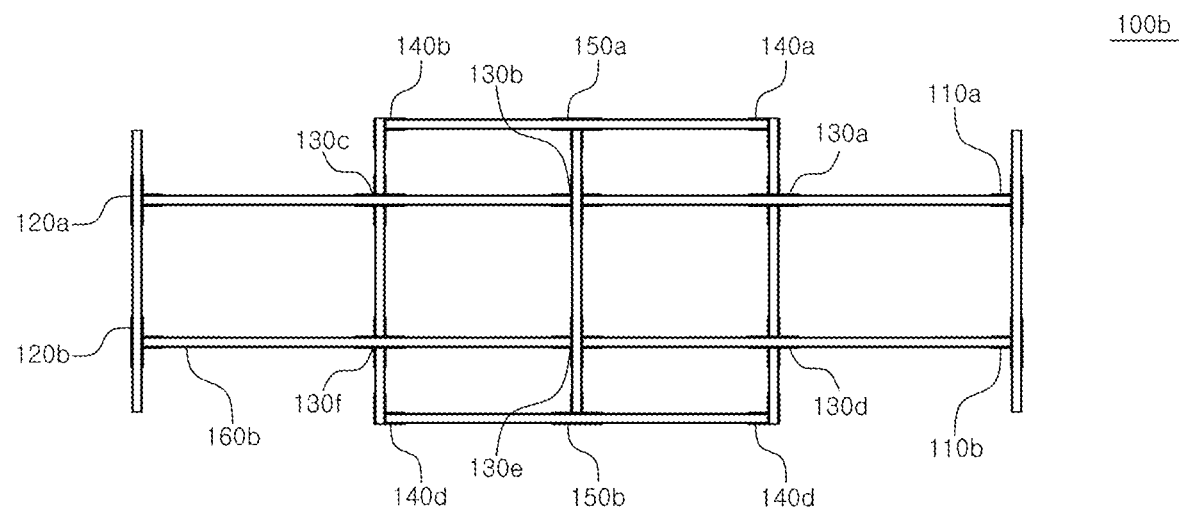
FIG. 6 is a cross-sectional view illustrating the lower frame of the platform structure for an electric vehicle according to the present disclosure.
Figure 7:
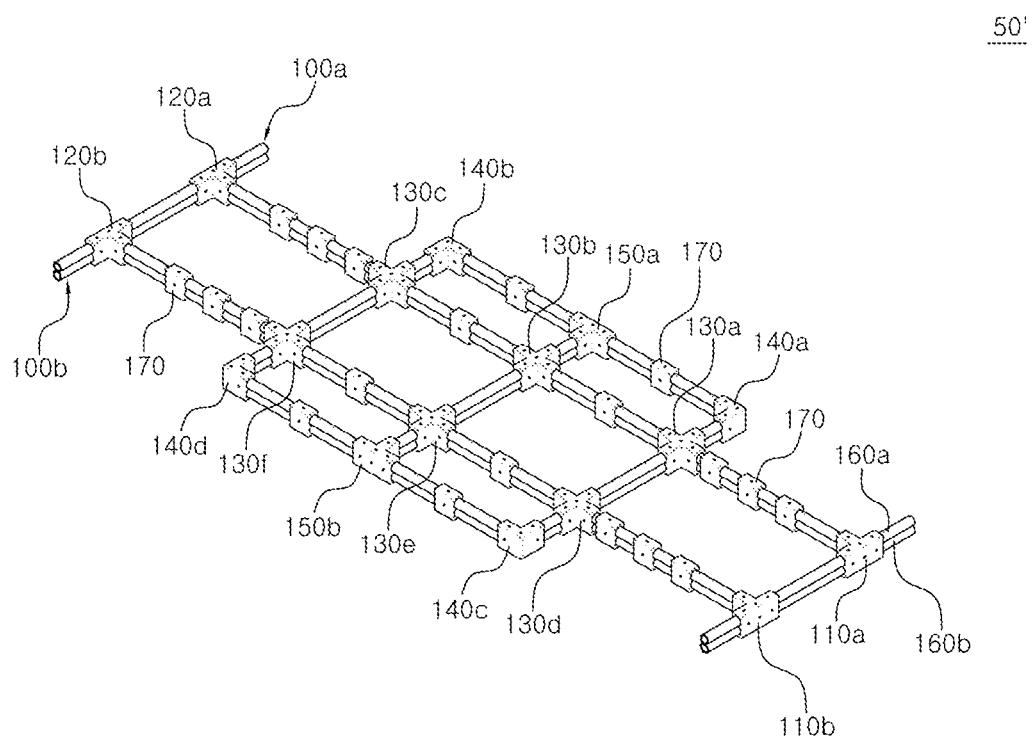
FIG. 7 is a perspective view illustrating a state in which an installation bracket for installing structures such as parts and covers is installed on the platform structure for an electric vehicle according to the present disclosure.
Figure 8:
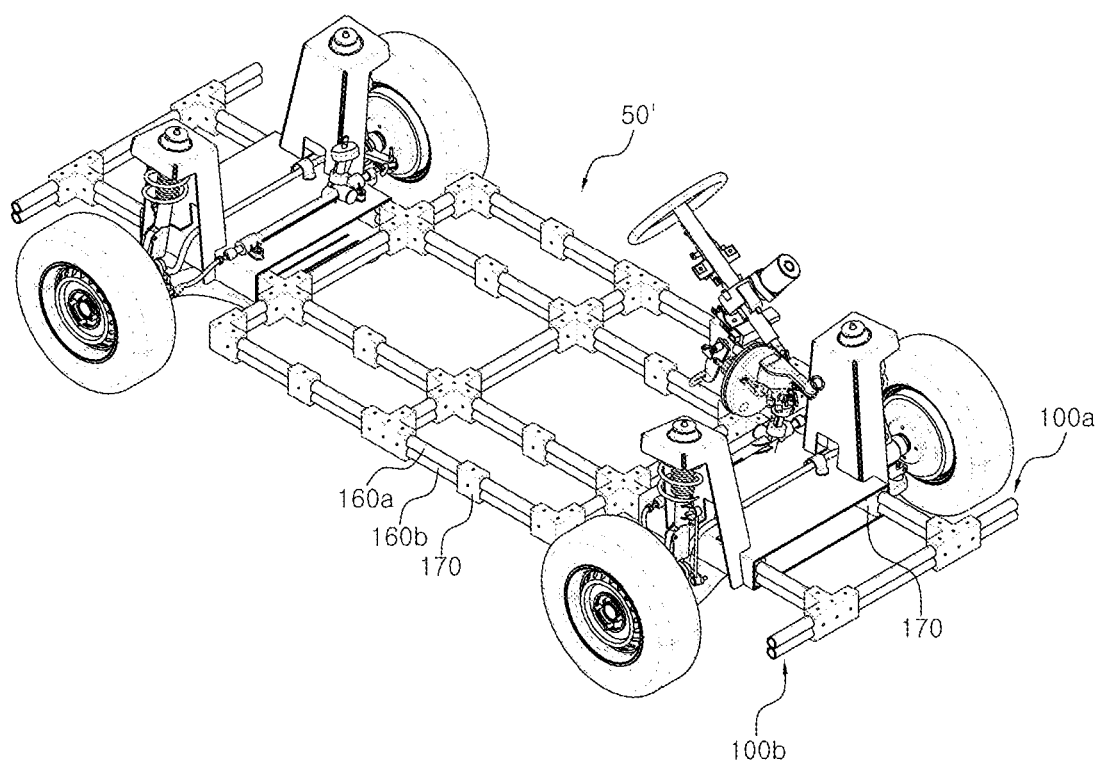
FIG. 8 is a view illustrating an electric vehicle platform to which the platform structure for an electric vehicle according to the present disclosure is applied.

In this case, FIG. 1 is a perspective view illustrating a platform structure for an electric vehicle according to a first embodiment of the present disclosure; FIG. 2 is a cross-sectional view illustrating the platform structure for an electric vehicle according to the first embodiment of the present disclosure; FIG. 3 is a cross-sectional view illustrating the platform structure for an electric vehicle according to a second embodiment of the present disclosure; FIG. 4 is a perspective view illustrating the platform structure for an electric vehicle according to a third embodiment of the present disclosure; FIG. 5 is a cross-sectional view illustrating the upper frame of the platform structure for an electric vehicle according to the present disclosure; FIG. 6 is a cross-sectional view illustrating the lower frame of the platform structure for an electric vehicle according to the present disclosure; FIG. 7 is a perspective view illustrating a state in which an installation bracket for installing structures such as parts and covers is installed on the platform structure for an electric vehicle according to the present disclosure; and FIG. 8 is a view illustrating an electric vehicle platform to which the platform structure for an electric vehicle according to the present disclosure is applied.

The present disclosure relates to the platform structure for an electric vehicle. More particularly, the present disclosure relates to the platform structure 50 for the electric vehicle in which a frame configured by coupling pipes to each other to form a lattice structure is installed to have a vertical double structure, and each pipe constituting an upper frame and each pipe constituting a lower frame intersect with each other such that rigidity of the platform structure is secured and the manufacturing period thereof due to easy manufacturing is decreased to reduce manufacturing cost. As for the configuration of the platform structure for an electric vehicle, as illustrated in FIG. 1, the frame 100 of the platform is configured in such a manner that pipes 160 are coupled to each other by brackets to form a lattice structure.

In this case, the brackets include a front bracket 110 provided at the front, a rear bracket 120 provided at the rear, a cross bracket 130 provided in multiple rows between the front bracket 110 and the rear bracket 120, a corner bracket 140 provided at each of the left and right outer sides of each of the most front and rear rows of the cross bracket 130, and a side bracket 150 provided at each of the left and right outer sides of the middle row of the cross bracket 130.

More specifically, each of the front bracket 110 and the rear bracket 120 is configured as a "⊢" shape having a protruding part formed toward the center part of the platform structure 50 for an electric vehicle such that a pipe 160 can be coupled to each of the three directional end portions of each of the front bracket 110 and the rear bracket 120.

In addition, the cross bracket 130 is configured to have a "+" shape such that a pipe 160 can be coupled to each of four directional end portions of the cross bracket 130.

Furthermore, the corner bracket 140 is configured by bending to have an "L" shape such that a pipe 160 can be coupled to each of the both bent end portions of the corner bracket 140.

Additionally, the side bracket 150 is configured as a "⊤" shape having a protruding part formed toward the center part of the platform structure 50 for an electric vehicle such that a pipe 160 can be coupled to each of the three directional end portions of the side bracket 150.

Accordingly, the front bracket 110, the rear bracket 120, the cross bracket 130, the corner bracket 140, and the side bracket 150 are connected to neighboring brackets 110, 120, 130, 140, and 150 at the front, rear, left, and right by pipes 160 such that the connected pipes form a lattice shape so as to constitute the platform structure 50 for an electric vehicle.

Here, the pipe 160 may be formed in various shapes such as a circle and a polygon, and may be made of various materials such as steel, carbon, and aluminum alloy. In particular, when the pipe 160 is a carbon pipe, the pipe 160 is advantageous in terms of rigidity and weight reduction.

As described above, the platform structure is composed of the front bracket 110, the rear bracket 120, the cross bracket 130, the corner bracket 140, the side bracket 150 and the pipe 160, and each of the components are coupled to each other to be assembled by coupling means such as bolts. Accordingly, the platform structure of the present disclosure can be manufactured to be lighter than a conventional platform structure in which components are coupled to each other by adhesive or welding. Furthermore, the platform structure of the present disclosure is modularized to have a simple structure, thereby enabling easy manufacturing and reducing a manufacturing period to reduce manufacturing cost.

Meanwhile, according to the first embodiment, as illustrated in FIG. 1, the front brackets 110a and 110b and the rear brackets 120a and 120b are provided respectively in pairs respectively at the left and right in respective rows.

In addition, the cross brackets 130a, 130b, 130c, 130d, 130e, and 130f are installed in three rows between the left and right front brackets 110a and 110b and the left and right rear brackets 120a and 120b.

Furthermore, the corner brackets 140a and 140b, and 140c and 140d are provided respectively at the left and right outer sides of the cross brackets 130a and 130d, and 130c and 130f of the most front row and the most rear row, respectively, among the cross brackets 130a, 130b, 130c, 130d, 130e, and 130f such that the corner brackets are shaped to constitute the corners of a large rectangle.

Additionally, the side brackets 150a and 150b are provided respectively at the left and right outer sides of the cross brackets 130b and 130e, respectively, of the middle row among the cross brackets 130a, 130b, 130c, 130d, 130e, and 130f.

Accordingly, one pipe 160 passes through and is coupled to each of the pair of front brackets 110a and 110b and the pair of rear brackets 120a and 120b.

Next, the corner brackets 140a and 140b and the side bracket 150a are connected to each other by one pipe 160, and the corner brackets 140c and 140d and the side bracket 150b are connected to each other by one pipe 160.

Next, pipes 160 pass through and are coupled to the cross brackets 130a, 130b, 130c, 130d, 130e, and 130f in front-to-rear or left-to-right directions, and pipes are coupled to the cross brackets in the left-to-right or front-to-rear directions intersecting with the front-to-rear or left-to-right directions to be connected to the front brackets 110a and 110b, the rear brackets 120a and 120b, the corner brackets 140a, 140b, 140c, and 140d, and the side brackets 150a and 150b neighboring to the cross brackets.

In addition, pipes pass through and are coupled to the cross brackets 130a, 130b, 130c, 130d, 130e, and 130f in directions intersecting with the front-to-rear or left-to-right directions in which pipes 160 pass through and are coupled to neighboring cross brackets 130a, 130b, 130c, 130d, 130e, and 130f at the front or rear of the cross brackets, so the platform structure 50 for an electric vehicle can have more rigidity against vibration.

That is, according to the first embodiment, as illustrated in FIG. 2, one pipe 160 passes through and is coupled to each of the cross brackets 130a and 130d of the most front row in a left-to-right direction, and the opposite end portions of the pipe 160 are connected to the corner brackets 140a and 140c, respectively.

Next, the cross brackets 130a and 130d of the most front row of the cross brackets are installed to be connected respectively to the front bracket 110a and 110b at the front of the frame by pipes 160.

Next, a pipe 160 passes through and is coupled to the cross bracket 130b or 130e of the middle row in a front-to-rear direction intersecting with a left-to-right direction in which a pipe 160 passes through and is coupled to the cross bracket 130a or 130d in front of the cross bracket 130b or 130e. Accordingly, the opposite end portions of the pipe 160 coupled to the cross brackets 130b or 130e are connected to the cross bracket 130a or 130d of the most front row and the cross bracket 130c or 130f of the most rear row.

Next, the cross brackets 130b and 130e of the middle row are coupled to each other by a pipe 160, and are connected respectively to the side brackets 150a and 150b neighboring to the cross brackets 130b and 130e, respectively, by other pipes 160.

Next, a pipe 160 passes through and is coupled to the cross bracket 130c and 130f of the most rear row in a left-to-right direction intersecting with front-to-rear directions in which pipes 160 pass through and are coupled to the cross brackets 130b and 130e in front of the cross brackets 130c and 130f, and the opposite end portions of the pipe 160 coupled to the cross brackets 130c and 130f are connected respectively to the corner brackets 140b and 140d.

Next, the cross brackets 130c and 130f of the most rear row are connected respectively to the rear brackets 120a and 120b at the rear side of the cross brackets 130c and 130f by pipes 160.

Meanwhile, according to the second embodiment, as illustrated in FIG. 3, each pipe 160 passes through and is coupled to the cross bracket 130a or 130d of the most front row in the front-to-rear direction, and the opposite end portions of the pipe 160 are connected to the front bracket 110a or 110b and the cross bracket 130b or 130e of the middle row at the rear side of the cross brackets 130a and 130d.

Next, the cross brackets 130a and 130d of the most front row are coupled to each other by a pipe 160, and are connected to the corner brackets 140a and 140c neighboring to the cross brackets 130a and 130d by other pipes 160.

Next, one pipe 160 passes through and is coupled to the cross brackets 130b and 130e of the middle row in a direction intersecting with front-to-rear directions in which pipes 160 pass through and are coupled to the cross brackets 130a and 130d in front of the cross brackets 130b and 130e, and the opposite end portions of the pipe 160 coupled to the cross brackets 130b and 130e are connected respectively to the side brackets 150a and 150b.

Next, one pipe 160 passes through and is coupled to each of the cross brackets 130c and 130f of the most rear row in a front-to-rear direction intersecting with a left-to-right direction in which a pipe 160 passes through and is coupled to the cross brackets 130b and 130e of the middle row in front of the cross brackets 130c and 130f, and the opposite end portions of the pipe 160 coupled to each of the cross brackets 130c and 130f are connected respectively to cross bracket 130b or 130e of the middle row in front of the cross brackets 130c or 130f and to the rear bracket 120a or 120b.

Next, the cross brackets 130c and 130f of the most rear row are coupled to each other by a pipe 160, and are connected respectively to neighboring corner brackets 140b and 140d by other pipes 160.

Here, the number of the front brackets 110a and 110b, the rear brackets 120a and 120b, the cross brackets 130a, 130b, 130c, 130d, 130e, and 130f, the corner brackets 140a, 140b, 140c, and 140d, and the side brackets 150a and 150b which are configured as described may be increased or decreased according to the size of the platform structure 50 for an electric vehicle to be configured.

Meanwhile, according to the third embodiment of the platform structure 50' for an electric vehicle according to the present disclosure, as illustrated FIGS. 4 to 6, pipes 160 are coupled to the front brackets 110a and 110b, the rear brackets 120a and 120b, the cross brackets 130a, 130b, 130c, 130d, 130e, and 130f, the corner brackets 140a, 140b, 140c, and 140d, and the side brackets 150a and 150b so as to form vertical pairs such that a frame 100a and 100b has a vertical double structure having upper and lower frames.

Here, the remaining configuration of the platform structure 50' for an electric vehicle configured as described above is the same as the configuration of the platform structure according to the embodiments described above, so the detailed description thereof will be omitted.

However, one pipe of the pipes 160a and 160b of the upper and lower frames 100a and 100b coupled to the cross bracket 130a, 130b, 130c, 130d, 130e, or 130f passes through and is coupled to the cross bracket 130a, 130b, 130c, 130d, 130e, or 130f in a front-to-rear or left-to-right direction, and another pipe of the pipes 160a and 160b of the upper and lower frames 100a and 100b coupled to the cross bracket 130a, 130b, 130c, 130d, 130e, or 130f is coupled to the cross bracket 130a, 130b, 130c, 130d, 130e, or 130f in the left-to-right or front-to-rear direction intersecting with the front-to-rear or left-to-right direction, so the platform structure 50' for an electric vehicle can have more rigidity against vibration.

That is, referring to the coupling directions of the pipes 160a and 160b coupled to the cross bracket 130a, 130b, 130c, 130d, 130e, and 130f in the upper and lower frames 100a and 100b illustrated respectively in FIGS. 5 and 6, when the upper pipes 160a of the pipes 160a and 160b coupled to the cross brackets 130a, 130b, 130c, 130d, 130e, and 130f at upper and lower sides thereof pass through and are coupled to the cross brackets in the left-to-right directions, the lower pipes 160b pass through and are coupled to the cross brackets in the front-to-rear directions, but when the upper pipes 160a pass through and are coupled to the cross brackets in the front-to-rear directions, the lower pipes 160b pass through and are coupled to the cross brackets in the left-to-right directions.

Therefore, the pipes 160a and 160b passing through each of the cross brackets 130a, 130b, 130c, 130d, 130e, and 130f at the upper and lower sides thereof intersect with each other, thereby further reinforcing the rigidity of each of the frames 100a and 100b.

Meanwhile, according to the platform structure 50' for an electric vehicle of the present disclosure, as illustrated in FIGS. 7 and 8, an installation bracket 170 through which the pipes 160a and 160b pass to be coupled thereto is provided such that each part of a vehicle and a body panel thereof can be easily installed.

That is, the installation bracket 170 is formed in an "1" shape and is configured such that pipes 160 pass through and are coupled to the installation bracket 170.

Accordingly, parts of a vehicle or a body panel thereof are located to correspond to a position at which the installation bracket 170 is installed to be fastened thereto by coupling means such as bolts.

Accordingly, according to the platform structure 50 or 50' for an electric vehicle according to the present disclosure as described above, a frame configured by coupling pipes to each other to form a lattice structure is installed to have a vertical double structure, and each pipe constituting an upper frame and each pipe constituting a lower frame intersect with each other such that rigidity of the platform structure is secured and the manufacturing period thereof due to easy manufacturing is decreased to reduce manufacturing cost. Accordingly, the platform structure for an electric vehicle has various advantages.

Although the exemplary embodiments of the present disclosure have been described above, the scope of the present disclosure is not limited thereto, but extends to a scope substantially equivalent to the embodiments of the present disclosure. Various modifications may be made by those skilled in the art to which the present disclosure pertains without departing from the spirit of the present disclosure.

INDUSTRIAL APPLICABILITY

The present disclosure relates to the platform structure for an electric vehicle. More particularly, the present disclosure relates to the platform structure for an electric vehicle in which a frame configured by coupling pipes to each other to form a lattice structure is installed to have a vertical double structure, and each pipe constituting an upper frame and each pipe constituting a lower frame intersect with each other such that rigidity of the platform structure is secured and the manufacturing period thereof due to easy manufacturing is decreased to reduce manufacturing cost.

What is claimed is:

1. A platform structure for an electric vehicle, the structure comprising:
   a frame of the platform structure configured in such a manner that pipes are coupled to each other by brackets to form a lattice structure, wherein
   the brackets comprise:
      a front bracket provided at a front of the frame,
      a rear bracket provided at a rear of the frame,
      cross brackets provided respectively in multiple rows between the front bracket and the rear bracket,
      a corner bracket provided at each of left and right outer sides of each of most front and rear rows of the cross brackets, and
      a side bracket provided at each of left and right outer sides of a middle row of the cross brackets.

2. The structure of claim 1, wherein pipes pass through and are coupled to the cross brackets in a front-to-rear or left-to-right direction, and pipes are coupled to the cross brackets in the left-to-right or front-to-rear direction intersecting with the front-to-rear or left-to-right direction.

3. The structure of claim 2, wherein the pipes pass through and are coupled to the cross brackets in the direction intersecting with the front-to-rear or left-to-right direction in which pipes pass through and are coupled to neighboring cross brackets at fronts or rears of the cross brackets.

4. The structure of claim 1, wherein the pipes are coupled to the brackets so as to form vertical pairs such that the frame has a vertical double structure having upper and lower frames.

5. The structure of claim 4, wherein
   one pipe of the pipes of the upper and lower frames coupled to the cross brackets passes through and is coupled to each of the cross brackets in the front-to-rear or left-to-right direction, and
   another pipe of the pipes of the upper and lower frames coupled to the cross brackets is coupled to each of the cross brackets in the left-to-right or front-to-rear direction intersecting with the front-to-rear or left-to-right direction.

6. The structure of claim 4, further comprising:
   an installation bracket through which the pipes pass to be coupled thereto.

* * * * *